United States Patent [19]

Baker et al.

[11] Patent Number: 4,861,406
[45] Date of Patent: Aug. 29, 1989

[54] METHOD AND APPARATUS FOR HANDLING PLIES OF COMPOSITE MATERIAL

[75] Inventors: Edwin T. Baker; George V. Neilson, both of Auburn; George R. Stumpf, Jr., Seattle, all of Wash.

[73] Assignee: The Boeing Company, Seattle, Wash.

[21] Appl. No.: 86,312

[22] Filed: Aug. 17, 1987

[51] Int. Cl.$^4$ ............................................. B32B 31/04
[52] U.S. Cl. .................................. 156/230; 156/238; 156/247; 156/249; 156/250; 156/256; 156/494; 156/495; 156/517
[58] Field of Search .............. 156/230, 234, 238, 247, 156/249, 242, 245, 494, 495, 497, 521, 519, 530, 552, 517, 250, 256

[56] References Cited

U.S. PATENT DOCUMENTS

| | | | |
|---|---|---|---|
| 3,574,026 | 4/1971 | Kucheck | 156/152 |
| 3,598,006 | 8/1971 | Gerber et al. | 83/14 |
| 3,615,094 | 10/1971 | Connor | 273/157 R |
| 3,738,888 | 6/1973 | Williams | 156/238 |
| 3,813,268 | 5/1974 | Kerwin | 156/247 |
| 3,909,342 | 9/1975 | Shook | 156/522 |
| 3,996,089 | 12/1976 | More et al. | 156/235 |
| 4,059,470 | 11/1977 | Primavesi et al. | 156/249 |
| 4,306,928 | 12/1981 | Okui | 156/267 |
| 4,379,017 | 4/1983 | Barta | 156/249 |
| 4,475,976 | 10/1984 | Mittelstadt et al. | 156/286 |
| 4,517,872 | 5/1985 | Dontscheff | 85/880 |
| 4,548,859 | 10/1985 | Kline et al. | 428/251 |
| 4,557,783 | 12/1985 | Grone et al. | 156/257 |
| 4,588,466 | 5/1986 | Eaton | 156/521 |

Primary Examiner—Caleb Weston
Attorney, Agent, or Firm—Joan H. Pauly

[57] ABSTRACT

A web (102) of backing material to which a web (104) of composite material is adhered is tensioned between two reels (12). A mold (100) is brought into position relative to the webs (102, 104) and located in an oriented closely spaced position relative to a ply (106) cut from the web (104). Localized downward forces are applied to the backing material (102) opposite the ply (106) by extending vacuum cups (40) or ejecting streams of air from nozzles (72). The downward forces move the ply (106) toward the mold (100) and into contact with portions of the mold (100). The ply (106) adheres to the portions of the mold (100) which it contacts. The vacuum cups (40) are moved along the web (102) and then retracted. The suction of the vacuum cups (40) and the tensioning of the web (102) cause separation of the web (102) from the adhered ply (106). When streams of air provide the downward force, the tensioning of the web (102) causes the separation.

5 Claims, 5 Drawing Sheets

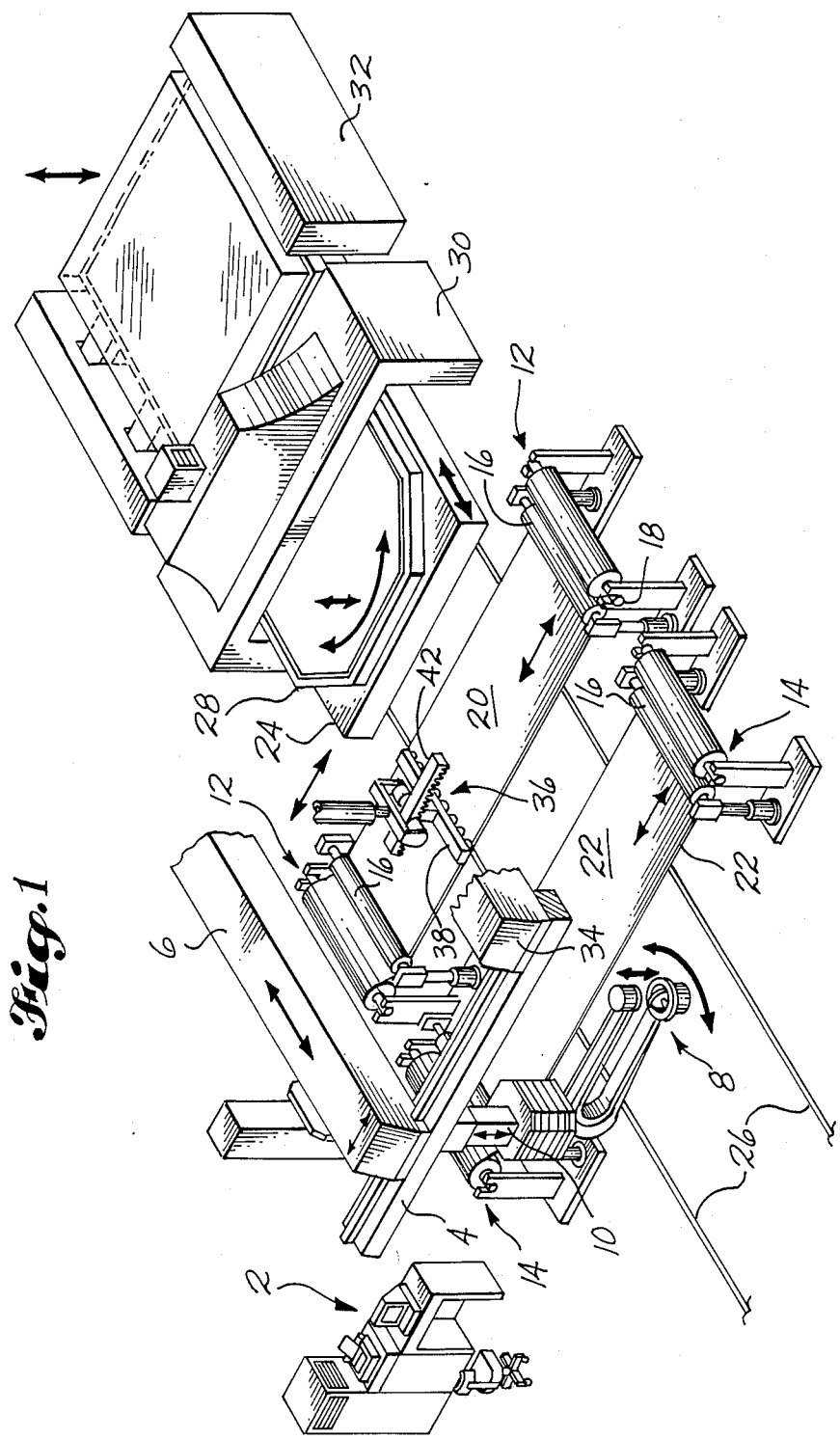

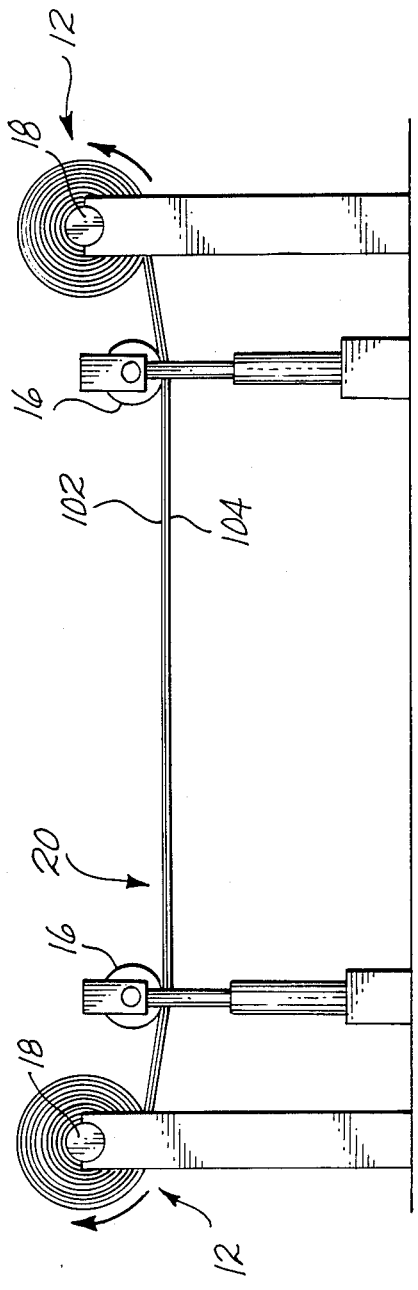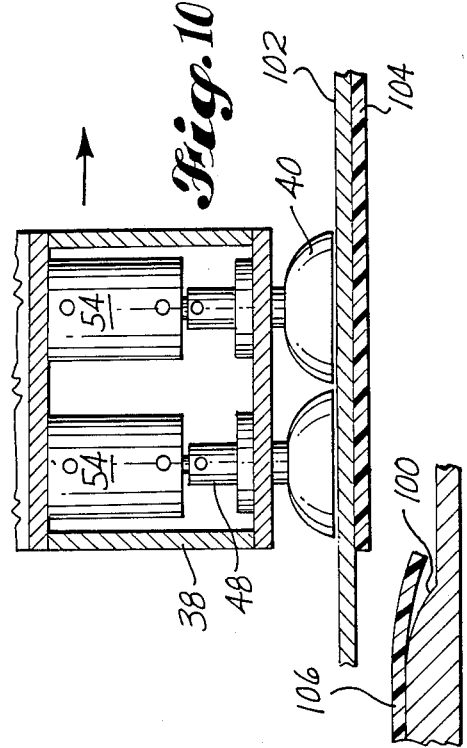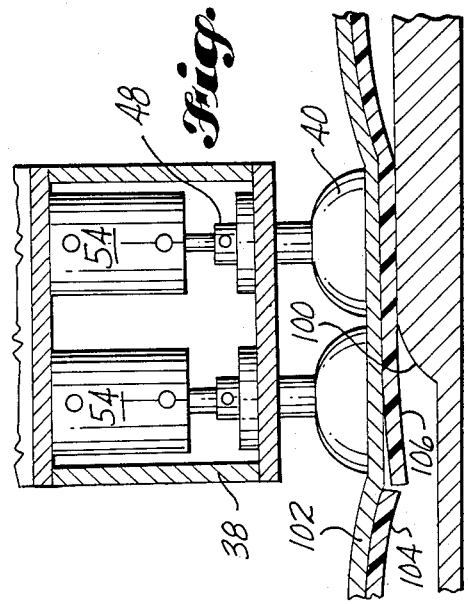

METHOD AND APPARATUS FOR HANDLING PLIES OF COMPOSITE MATERIAL

TECHNICAL FIELD

This invention relates to systems for fabricating an article from a plurality of plies of fiber reinforced/resin matrix composite material and, more particularly, to such a system in which localized force is applied to a tensioned web of backing material to which a cut ply is removably adhered to bring the ply into contact with portions of a mold surface to adhere the ply to the mold surface, and the force is removed and localized suction is applied to the backing material to separate the ply from the backing material.

BACKGROUND ART

The use of fiber reinforced/resin matrix composite materials, such as graphite fiber reinforced epoxy resin materials, in the fabrication of aircraft components is becoming increasingly important. The fabrication of a component often begins with a roll of composite material consisting of reinforcing fibers preimpregnated with resin and attached to a backing paper. The fibers are oriented in various manners. The most common fiber orientations are a unidirectional orientation of substantially continuous fibers and woven patterns of substantially continuous fibers. An aircraft component is typically fabricated from a plurality of plies having differing shapes and fiber orientations, which plies are formed into a contoured laminate.

The fabrication of such contoured laminates was initially carried out by manual procedures. Such procedures are highly labor intensive and time consuming and, thus, very expensive. In addition, since manual procedures tend to be operator dependent, it is difficult to consistently produce componenets within design tolerances using manual procedures. Therefore, various automated systems for producing contoured laminates have been proposed. The proposed systems generally involve a plurality of steps, including cutting out the plies, separating the plies from scrap and from each other, locating and orienting the plies to lay-up mold surfaces, removing the backing material from the plies, laminating and compacting each ply, and forming the stack of plies to a contour shape. The order of the steps varies from system to system. Preferably, the ply shapes are nested or grouped on the sheets of composite material in order to optimize utilization of the composite material.

There are a number of problems associated with the automated systems which are currently being proposed and/or built for the aerospace industry. The systems generally require complex and costly equipment to separate the cut plies from scrap and from each other. Additional equipment is required to maintain ply accountability (keep track of the plies) throughout the system and to determine ply orientation prior to placing each ply on a lay-up surface. Removing the backing paper from the composite material after the ply cutting process, which usually cuts both the composite material and the backing material, has also required complex equipment. The need for complex and expensive equipment to carry out the various steps of such systems makes such systems very costly. In addition, the large amount of equipment results in very high floor space requirements, which further increase the overall system cost.

U.S. Pat. No. 3,996,089, granted Dec. 7, 1976, to E. R. More et al., discloses a method for handling composite materials. In the method, composite material in tape form is sandwiched between sheets of material called "liners". The composite material tape is more adherent to the lower liner than the upper liner. The tape and liners are positioned on a cutting table with the lower liner adjacent to the table. A vacuum in the cutting table holds the tape and liners in place, and a reciprocating cutter head cuts out a plurality of plies of desired sizes, shapes, and filament orientations. The upper liner and the composite material tape are cut, but the lower liner is left substantially intact. Following the cutting operation, the cut portions of the upper liner are manually stripped off the tape. More et al. state that the stripping of the upper liner can be accomplished by an automated process, but do not describe such a process. With the lower liner still being held to the table by the vacuum, a stacking head sequentially picks up the cut plies. The head moves in position and descends to contact each ply to pick it up. The ply separates from the lower liner because the force of adhesion between the lower liner and the ply is less than the force of the vacuum (or the adhesion between the ply and the stacking head (or the ply that was last picked up by the stacking head). The stack of plies is manually removed from the stacking head. More et al. do not show or describe tensioning of either liner or the composite material tape. It appears that a length of tape and a length of each liner material are laid on the table and are substantially coextensive with the table.

Systems in which a sheet-like workpiece is adhered to and is carried by a strip of backing material and in which a portion of the workpiece is separated from the backing material by bending the backing material and workpiece relative to each other are disclosed in U.S. Pat. Nos. 3,574,026, granted Apr. 6, 1971, to L. Kucheck; No. 3,738,888, granted June 12, 1973, to E. C. Williams; No. 4,306,928, granted Dec. 22, 1981, to T. Okui; and No. 4,557,783, granted Dec. 10, 1985, to R. J. Grone et al. In the Kucheck process, label-forming material is temporarily separated from its backing strip by bending the backing strip away from the material. The labels are cut from the separated material and are relaminated onto the backing strip. The remaining skeleton of label-forming material bends away from the labels and is taken up on a separate reel. Between the delamination and relamination steps, the label-forming material is held to a moving belt adhesive side out by a suction device. In the Williams device, resist disks for semiconductive wafers are carried by a backing tape that is held taut yet free to move between a clamping station and a stripping station.

U.S. Pat. No. 3,598,006, granted Aug. 10, 1971, to H. J. Gerber et al., discloses a method in which a stack of sheet material, such as fabric, is held by a vacuum in position to be cut. U.S. Pat. No. 3,615,094, granted Oct. 26, 1971, to G. P. Connor, discloses a method of making an inlay puzzle in which a plastic sheet holds the pieces together during manufacture and is later peeled off by the user. U.S. Pat. No. 3,909,342, granted Sept. 30, 1975, to G. D. Shook, discloses apparatus for making a blanket for laminating on a vessel hull. Scrim material is bonded to a balsa panel, and the panel is cut into squares while still held together by the scrim.

The above patents and the prior art that is discussed and/or cited therein should be studied for the purpose of putting the present invention into proper perspective relative to the prior art.

DISCLOSURE OF THE INVENTION

A subject of the invention is, in a method of fabricating an article from a plurality of plies of fiber reinforced/resin matrix composite material, said method being of the type in which a cut ply is carried by and removably adhered to a web of backing material, an improved method of positioning the ply on a mold surface and separating the ply from the backing material. According to an aspect of the invention, the improved method comprises tensioning the web of backing material. The web and the mold surface are positioned relative to each other to locate the ply and the mold surface in oriented closely spaced positions relative to each other. After the web and the mold surface have been positioned, localized force is applied to the surface of the tensioned backing material opposite the ply to move portions of the ply into contact with the mold surface and adhere said portions of the ply to the mold surface. While the tensioning is continued, the force is removed and the backing material is separated from the ply.

The step of separating the backing material may be carried out in various ways. In the most preferred embodiment, the separating comprises applying suction to the surface of the tensioned backing material, and causing separation of the backing material by a combinaton of the suction and the tensioning of the backing material. In another preferred embodiment, the separating of the backing material comprises allowing the tensioning of the backing material to cause the backing material to separate from the ply.

A preferred feature of the invention is the application of a plurality of localized forces. After the web and the mold surface are positioned, a plurality of localized forces are applied to the surface of the tensioned backing material opposite the ply to move the ply into contact with portions of the mold surface and adhere the ply to said portions of the mold surface. The forces are removed while the tensioning is continued. This feature of the invention is preferred because it increases the efficiency of the method by increasing the speed with which the ply is adhered to the mold surface and separated from the backing material. Another preferred feature of the invention is the progressive adhering of portions of the ply to the mold surface and the progressive separation of the backing material from the ply.

Another subject of the invention is a method of fabricating an article from a plurality of plies of fiber reinforced/resin matrix composite material. According to an aspect of the invention, the method comprises positioning opposite ends of a web of composite material, which is removably adhered to a web of backing material, on spaced reels. A ply is cut from a portion of the web of composite material between the reels without cutting through the backing material. A torque is applied to the reels to tension the web of backing material. A mold surface is moved relative to the web of backing material to position the cut ply and the mold surface in oriented closely spaced positions relative to each other. After the cut ply and the mold surface have been so positioned, localized force is applied to the surface of the tensioned backing material opposite the ply to move portions of the ply into contact with the mold surface and adhere said portions of the ply to the mold surface, and while the tensioning is continued, the force is removed and the backing material is separated from the ply. The mold surface and the adhered cut ply are moved away from the web of backing material. The adhered cut ply is formed to the mold surface. The reels are rotated to position the web of composite material for cutting another ply. These steps of cutting a ply, moving the mold surface to position the cut ply and the mold surface relative to each other, applying localized force, and removing the localized force and separating the backing material are repeated.

Still another subject of the invention is, in a system of fabricating an article from a plurality of plies of fiber reinforced/resin matrix composite material in which a cut ply is carried by and removably adhered to a web of backing material, apparatus for positioning the ply on a mold surface and separating the ply from the backing material. According to an aspect of the invention, the apparatus comprises means for tensioning the web of backing material and means for moving the mold surface relative to the web to locate the ply and the mold surface in oriented closely spaced positions relative to each other. The apparatus also includes locating means for applying localized force to the surface of the tensioned backing material opposite the ply to move portions of the ply into contact with the mold surface and adhere said portions of the ply to the mold surface, and for removing the force. The locating means includes a vacuum cup, means for urging the vacuum cup against the backing material to apply the localized force and push the ply into contact with the mold surface, and means for applying suction to the backing material through the vacuum cup.

The means for tensioning preferably comprises two spaced reels and means for applying a torque to the reels. The locating means preferably includes an array of vacuum cups, valve means, and means for moving the array along the tensioned backing material. Each cup in the array is independently extensible toward the backing material and retractable away from the backing material. The valve means allows application of suction through each vacuum cup when the vacuum cup is in an extended position.

The method and apparatus of the invention make it possible to increase the efficiency and reduce the overall cost of fabricating articles from fiber reinforced/resin matrix composite materials. The apparatus of the invention is relatively simple in structure and, thus, is relatively inexpensive to manufacture and maintain. In addition, the apparatus may readily be arranged to require a minimal amount of floor space. The method and apparatus of the invention readily lend themselves to automated procedures and make it possible to simplify the overall fabrication process. By the use of the method and apparatus of the invention, some of the steps encountered in known systems can be either combined or eliminated. For example, the invention eliminates the need to maintain systems of ply accountability and combines the separating of the plies from scrap and from each other, the locating and orienting of the plies, and the removing of the backing material from the plies in a simplified and efficient procedure. The method and apparatus of the invention make is possible to quickly and accurately form a stack of plies on a mold surface and to consistently produce components within design tolerances.

These and other advantages and features will become apparent from the detailed description of the best modes for carrying out the invention that follows.

BRIEF DESCRIPTION OF THE DRAWING

In the drawings, like element designations refer to like parts throughout, and:

FIG. 1 is a pictorial view of an installation into which the first preferred embodiment of the apparatus of the invention has been incorporated.

FIG. 2 is an elevational view of the tensioning apparatus shown in FIG. 1.

FIG. 9 is a cross-sectional view of the vacuum array with the vacuum cups in an extended position.

FIG. 10 is like FIG. 9 except that it shows the vacuum cups retracted from their extended position.

BEST MODES FOR CARRYING OUT THE INVENTION

Figure 3:
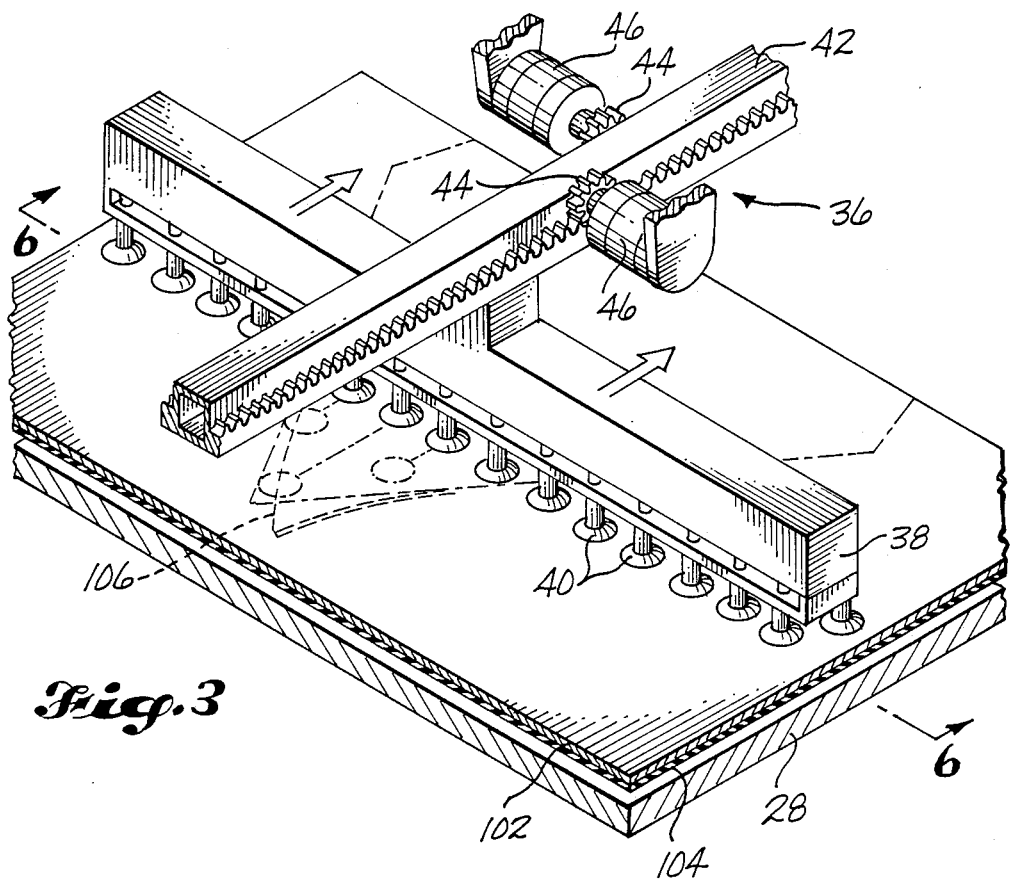
FIG. 3 is a pictorial view of the vacuum array apparatus shown in FIG. 1 moving across the backing material opposite a cut ply.

The drawings show apparatus that is constructed according to the invention and that also constitutes the best modes of the apparatus of the invention currently known to the applicants. The drawings also illustrate the best modes for carrying out the method of the invention currently known to the applicants.

In FIG. 1, the apparatus of the invention is shown incorporated into an automated installation for fabricating fiber reinforced/resin matrix composite material articles. It is anticipated that the primary application of the method and apparatus of the invention will be in installations of the type shown in FIG. 1. However, it is of course to be understood that the method and apparatus of the invention may also be used to advantage in other types of installations.

Referring to FIG. 1, the automated installation shown includes a controller 2 of a known type for controlling the operation of the parts of the installation in accordance with data supplied by a front end processor. The installation also includes a pair of side rails 4, one of which is shown in FIG. 1. A gantry 6 extends between and is movable horizontally along the rails 4. This type of arrangement is known in the art and permits the accurate positioning of elements of the installation carried by the gantry 6. A cutter 8 is carried by the gantry 6 and is movable along the gantry 6 in a horizontal direction perpendicular to the side rails 4. The cutter 8 is provided with a vertical actuator 10 for raising the cutter 8 so that it may be moved along the gantry 6 above the webs 20, 22 described below. The cutter 8 is preferably of the type described in U.S. Pat. No. 4,517,872, granted May 21, 1985, to H. Dontscheff.

Still referring to FIG. 1, the installation also includes a pair of horizontally spaced reels 12. Opposite ends of a web 20 of material are wound around the reels 12. A guide roller 16 is positioned adjacent to each reel 12 to guide the web 20 of material between the reels 12. Each reel 12 is provided with an electric motor 18 for applying a torque to the reels 12 to tension the web 20 of material between the reels 12 and for rotating the reels 12 to reposition the web 20 of material. FIG. 2 is a side view of the reel and guide roller arrangement illustrating the tensioning of the web of material. The arrows in FIG. 2 indicate the torque directions.

The installation shown in FIG. 1 also includes a second pair of reels 14 having guide rollers 16 positioned in the same manner as the guide rollers 16 associated with the reels 12 and supporting a web 22 of material in the same manner that the web 20 is supported by the reels 12 and their associated guide rollers 16. Two sets of reels and two webs of material are sufficient for fabricating most aircraft components. For example, the web 20 of material might comprise a broad sheet (38 to 60 inches) of unidirectional composite material adhered to a backing material, such as paper, and the web 22 might comprise a broad sheet of woven fiber composite material adhered to a sheet of backing material. If a particular component requires more than two types of composite material, e.g., unidirectional material and two types of woven material, one or more additional pairs of reels and guide rollers may easily be added to the installation shown in FIG. 1.

The installation shown in FIG. 1 also includes a shuttle platen 24 which moves along tracks 26 mounted in the floor. A turntable 28 is mounted on the platen 24 and is rotatable 360° to orient a mold positioned on the turntable 28 into any required orientation. A former/compactor 32 is positioned at one end of the tracks 26. A laser scanner 30 is positioned over the tracks between the former/compactor 32 and the webs 20, 22 of material. The platen 24 is movable along the tracks 26 to position a mold placed on the turntable 28 under either web 20, 22 of material and to move the mold through the laser scanner 30 and into the former/compactor 32.

The apparatus of the invention includes detaching apparatus 36. In the preferred embodiment shown in FIGS. 1-10, the detaching apparatus 36 comprises a housing 38 on which an array of vacuum cups 40 is mounted. See FIGS. 3 and 4. The array of vacuum cups 40 is movable along the web 20 of composite material and backing material by means of a rack and pinion mechanism 42, 44, shown in FIG. 3. The mechanism 42, 44 comprises a rack 42 to which the housing 38 is mounted and two pinions 44 which are driven by electric motors 46. The pinions 44 and the motors 46 may be mounted on and movable along the same gantry 6 as the cutter 8. However, they are preferably mounted on and movable along a second separate gantry 34. The two-gantry arrangement makes it possible to cut a ply of composite material from either web 20, 22 of material and at the same time operate the detaching apparatus 36 over the other web 20, 22 of material. The capability of simultaneously operating the cutter 8 and the detaching apparatus 36 increases the productivity and the flexibility of the installation. To further increase the productivity of the installation, a laser scanner 30 and former/compactor 32 may be provided at each end of the tracks 26. This makes it possible to operate two shuttle platens 24 simultaneously and to maximize utilization of the cutter 8 and the detaching apparatus 36. A single large mold or a plurality of small molds may be mounted on each of the turntables 28 associated with the platens 24.

Figure 5:
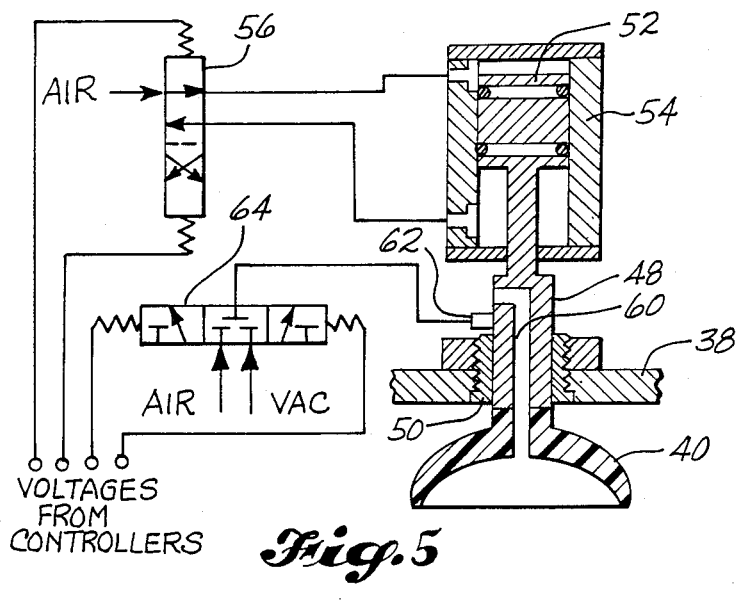
FIG. 5 is a sectional view of one of the vacuum cups shown in FIGS. 3 and 4 and its actuating cylinder, with the control apparatus shown schematically.

FIG. 5 illustrates the structure and functioning of one of the vacuum cups 40. The cup 40 has a stem 48 which slidably extends through a bushing 50 carried by the housing 38. The upper end of the stem 48 forms a piston 52 which reciprocates in a double-acting cylinder 54. A spindle valve 56 controls admission of pressurized air into the cylinder 54 on either side of the piston 52. The air pressure on the two sides of the piston 52 is balanced so that the cup 40 rides like a suspension system on a web of backing material. This allows the force against the backing material to be constant even though the backing material under tension naturally has a wavy configuration. The constant force can be adjusted to different levels for different types of composite material. A passageway 60 extends axially upwardly from the hollow interior of the cup 40 through the stem 48 and opens onto an outer circumferential surface of the stem 48. The passageway 60 aligns with and is in communication with a conduit 62 when the cup 40 is in an extended position. A spindle valve 64 controls communication of the conduit 62 with a source of air pressure and a vacuum source. Like the other elements of the installation, the spindle valves 56, 64 are controlled electrically by the controller 2. Each vacuum cup 40 has its own set of valves 56, 64 and may be independently extended and retracted and independently supplied with air pressure or a vacuum.

Figure 11:
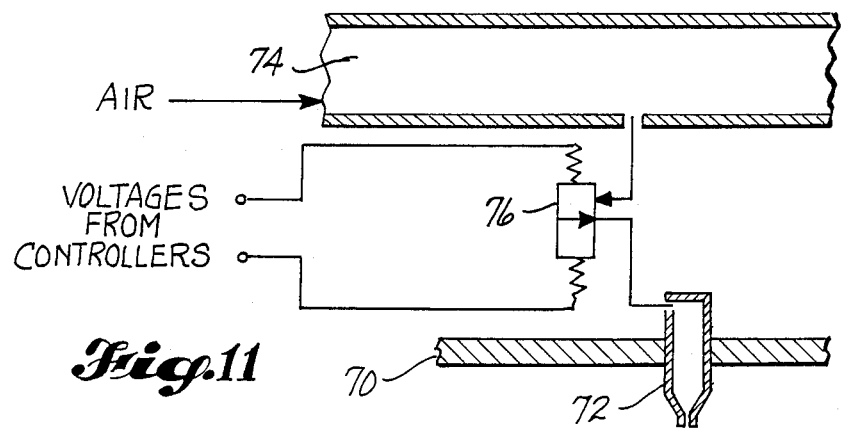
FIG. 11 is a cross-sectional view of the air jet nozzle of the second preferred embodiment with the control apparatus shown schematically.
Figure 12:
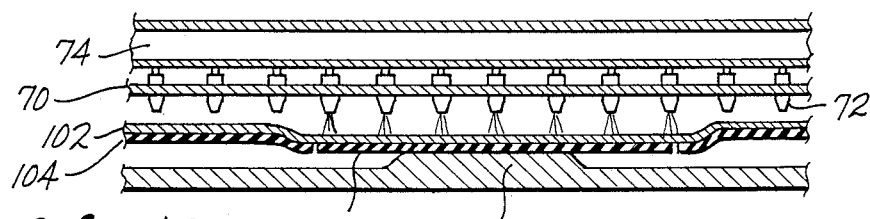
FIG. 12 is a sectional view of the array of nozzles of the second preferred embodiment, showing air jets moving the backing material and cut ply toward the mold surface.
Figure 13:
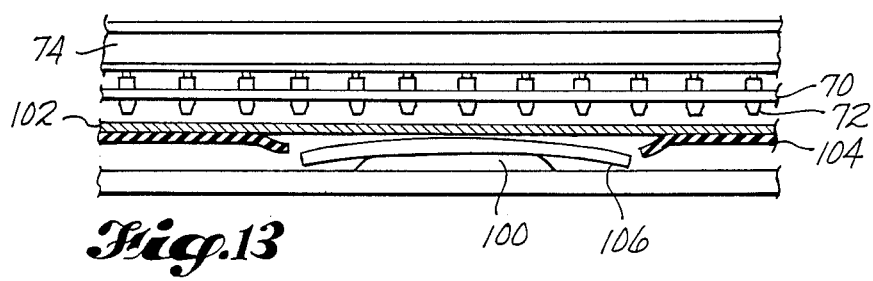
FIG. 13 is like FIG. 12 except that it shows the apparatus after the cessation of the air jets.

FIGS. 11-13 show an alternative embodiment of the detaching apparatus. In the alternative embodiment, the array of vacuum cups 40 is replaced by a similar array of nozzles 72 carried by a housing 70. Pressurized air is admitted into a manifold 74 formed in the housing 70. Each nozzle 72 has a spindle valve 76 which is independently controlled to eject a stream of pressurized air from the nozzle 72. Unlike the vacuum cups 40, the nozzles 72 are not extensible and retractable. The streams of pressurized air provide the localized forces for pushing the web of composite material and backing material toward the mold surface in place of the mechanical pushing force of the vacuum cups 40.

Another possible embodiment of the detaching apparatus would be the use of pistons or similar pressure devices for mechanically pushing the web of material toward the mold surface. The vacuum cup arrangement shown in FIGS. 1-10 is the most preferred embodiment of the detaching means because it allows more accurate control of the forces on the web of material and the most flexibility in adjusting the forces to the different characteristics of different types of composite material. In addition, the suction through the vacuum cups 40 provides a positive force to assist the tensioning of the backing material in causing separation of the backing material from the cut ply of composite material.

The method of the invention is carried out as follows. The fabrication lay-up mandrel or mold 100 is placed on and secured to the turntable 28 carried by the shuttle platen 24. After the mold 100 has been secured, the controller 2 shuttles the platen 24 through the laser scanner 30 to verify the identity of the mold 100 and to initialize the exact location and orientation of the mold 100 in the system. A roll 20 of unidirectional composite material adhered to backing paper is mounted on the first set of reels 12, and a second roll 22 of woven composite material adhered to backing material is mounted on the second set of reels 14. The composite material is mounted on the reels 12, 14 and suspended between the pairs of reels 12, 14 as shown in FIGS. 1 and 2. After the composite material has been mounted, the system applies a torque to the reels 12, 14 to tension the material webs 20, 22. The amount of tensioning is typically five to fifteen pounds of tension per inch of width of the material web. Each web 20, 22 is positioned with the backing paper facing upwardly and the composite material facing downwardly.

When the webs 20, 22 of material have been mounted and tensioned, the system is ready for the cutting operation. The cutter 8 is positioned alongside the web 20, 22 which is to be cut. In FIG. 1, the cutter 8 is positioned alongside the web 22 between the reels 14. To begin the cutting operation, the cutter C-frame is rotated to a position in which the web 22 is received between the cutter blade and anvil. After the C-frame is rotated, the blade and anvil are locked into a cutting position. During the cutting operation, the C-frame is driven by servos along the directions of the side rails 4 and the gantry 6 to cut the desired shape of ply. The cutter blade azimuth rotates to remain tangent to the cut direction during the cutting procedure. The cutter 8 cuts a ply from the web of composite material without cutting through the backing material. The material web 22 may be indexed forward or backward by rotating the reels 14 to allow cutting of a complete nest or group of cut ply shapes in one operation. This increases the efficiency of the cutting operation and the overall fabrication process. After a nest of ply shapes has been cut, the plies may be transferred to the mold 100 and detached from the backing paper in any designated order.

Figure 6:
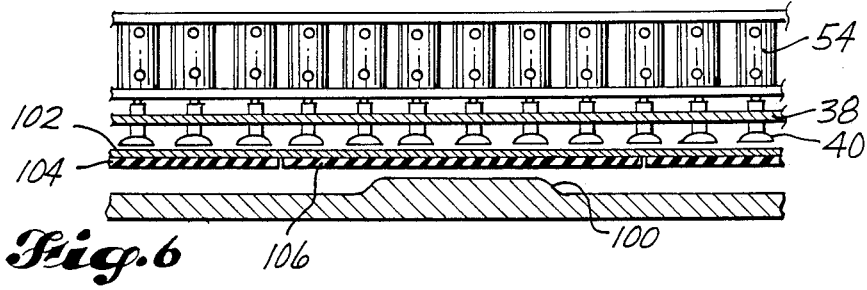
FIG. 6 is a sectional view taken substantially along the line 6—6 in FIG. 3, showing the vacuum cups in a retracted position.

FIGS. 6-10, 12, and 13 illustrate the positioning of a cut ply 106 on the mold 100 and the separating of the ply 106 from the web of backing material 102. The controller 2 moves the shuttle platen 24 along the tracks 26 to position the mold 100 precisely under the ply 106. The turntable 28 is operated to precisely orient the mold 100 with respect to the ply 106. FIG. 6 illustrates the positioning of the mold 100 relative to the cut ply 106 and the web 102 of backing material. The ply 106 and the mold 100 are in oriented closely spaced positions relative to each other. Typically, the spacing between the ply 106 and the mold 100 would be about one half to three quarters of an inch.

Figure 7:
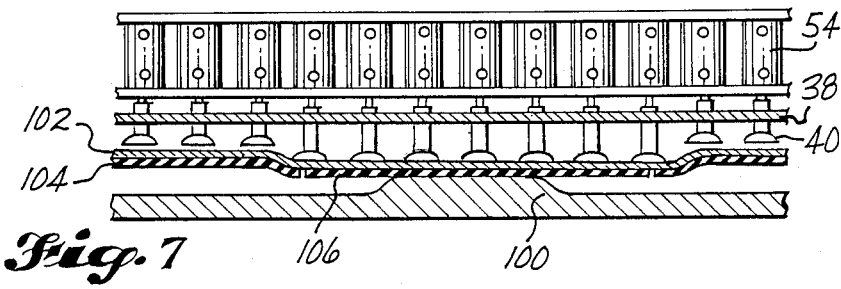
FIG. 7 is like FIG. 6 except that it shows the vacuum cups opposite the cut ply in an extended position.

After the mold 100 has been positioned as shown in FIG. 6, a plurality of localized forces are applied to the upper surface of the tensioned backing material 102 opposite the cut ply 106. The localized forces move portions of the cut ply 106 into contact with the upper mold surface 100 and adheres such portions of the ply 106 to the mold surface 100. As shown in FIGS. 7, 9, and 12, the ply 106 is brought into contact with the highest points of the mold 100.

In the preferred embodiment shown in FIGS. 1-10, the localized forces are provided by the downward forces exerted by the extending vacuum cups 40. The controller 2 extends only the cups 40 opposite the cut ply 106 to push the cut ply 106 toward the mold surface 100. As shown in FIG. 12, in the embodiment of FIGS. 11-13, streams of pressurized air from the nozzles 72 provide the downward forces on the web of backing material 102.

Figure 4:
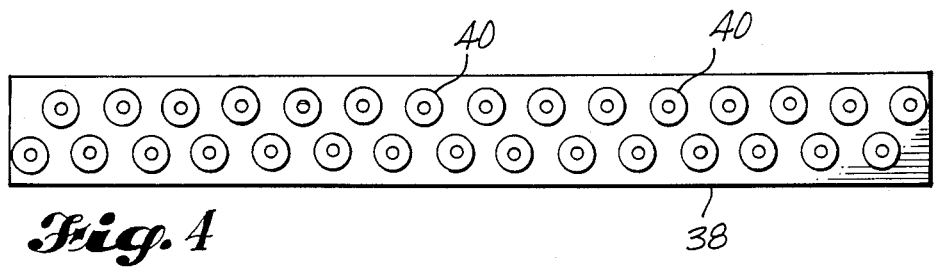
FIG. 4 is a bottom plan view of the vacuum array shown in FIG. 3.
Figure 8:
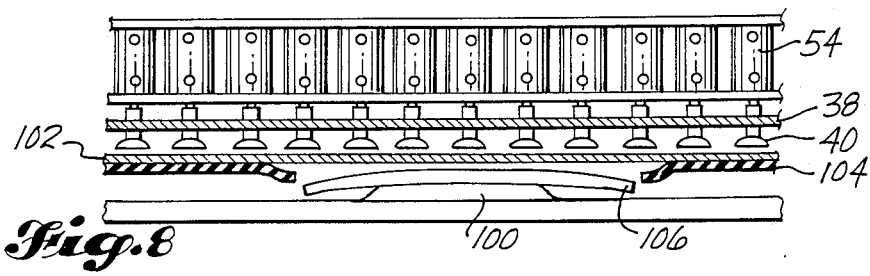
FIG. 8 is like FIGS. 6 and 7 except that it shows the vacuum cups retracted after having been extended.

FIG. 3 illustrates the movement of the array of vacuum cups 40 along the web of tensioned material. The rack and pinion mechanism 42, 44 is operated to position the array of vacuum cups 40 at the left edge (as shown) of the cut ply 106. As the array passes over the left edge of the material, the vacuum cups 40 opposite the ply 106 are extended as shown in FIGS. 7 and 9. Upon the extension of the cups 40, the valve 64 on each extending cup 40 is operated to apply a vacuum through the cup 40. The downward force of the cup 40 against the web of backing material 102 seals the cup 40 against the backing material 102 and forces the cut ply 106 to come into contact with and adhere to the mold surface 100. As the array continues to move across the web 102, the cups 40 opposite the cut ply 106 remain extended. The removal of the localized downward forces exerted by the cups 40 resulting from movement of the array allows the tensioning of the web 102 to cause the web 102 to separate from the portions of the ply 106 that have been traversed. The suction of the vacuum helps to pull the backing material 102 away from the cut ply 106. Each cup 40 is retracted when it reaches the right edge of the ply 106, as shown in FIGS. 8 and 10. During the retraction of the vacuum cups 40, each cup 40 is provided with a burst of low pressure air to help release the backing material 102 from the suction force of the vacuum. In its fully retracted position, each vacuum cup 40 is out of communication with both the air source and the vacuum source.

The movement of the array across the web 102 progressively adheres the ply 106 to the mold 100 and progressively separates the ply 106 from the web 102 until the backing paper 102 opposite the cut ply 106 has been completely covered by the detaching apparatus 36. The tensioning of the web 102 is maintained throughout the adhering and detaching procedure. The action of the vacuum cups 40 and the tensioning of the web 102 completely detach the ply 106 from the tensioned web of backing material 102 without disturbing the surrounding web 104 of composite material or adjacent cut plies in the web 104. As illustrated in FIG. 13, when nozzles 72 are used instead of vacuum cups 40, the tensioning of the web 102 causes the web 102 to separate from the adhered ply 106.

After the ply 106 has been adhered to the mold 100 and separated from the backing material 102 by the array of vacuum cups 40, the shuttle platen 24 moves the mold 100 and adhered ply 106 through the laser scanner 30 to verify and record the location of the unformed and uncompacted ply 106 on the mold 100. Then the shuttle platen 24 moves from the scanner 30 into the former/compactor 32. Inside the former/compactor 32, the platen 24 is raised to push the mold 100 into an inflated bag to form the ply 106 against the mold surface 100. A vacuum is then applied to compact the ply 106. Preferably, the forming and compacting operation is of the type disclosed in U.S. Pat. No. 4,475,976, granted Oct. 9, 1984, to R. F. Mittelstadt et al. The inflated bag may be provided with the type of breather material disclosed in U.S. Pat. No. 4,548,859, granted Oct. 22, 1985, to W. T. Kline et al. Alternatively, the breather material pattern disclosed by Kline et al. may be formed directly on the surface of the bag.

After the forming/compaction procedure, the shuttle platen 24 moves the mold 100 through the laser scanner 30 and then into position to recieve the next cut ply.

The process is repeated until a full stack of compacted plies has been formed on the mold 100. After the first ply 106 is formed on the mold 100, the mold surface to which each subsequent ply is adhered is formed by the outer surface of the previous ply.

The detaching apparatus may be varied from the two preferred embodiments shown and described herein without departing from the spirit and scope of the invention. For example, a single vacuum cup, push piston, or nozzle could be provided in place of an array of vacuum cups 40 or nozzles 72. In this case, the single detaching device would be moved back and forth across the web of backing material opposite the cut ply until the entire area had been covered. For example, a single vacuum cup would be extended into pushing contact with the near edge of the backing material opposite the ply and then moved across and back and forth the area opposite the ply without being retracted. The vacuum cup would provide a single localized pushing force and a continuous suction that are continuously applied to and removed from a continuous succession of localized areas of the web of backing material. This variation of the method of the invention has been tested and works very well to accomplish the goal of adhering the ply to the mold surface and separating the ply from the backing material. However, an array of detaching members is preferred because it performs the desired task much more quickly.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. In a system of fabricating an article from a plurality of plies of fiber reinforced/resin matrix composite material in which a cut ply is carried by and removably adhered to a web of backing material, apparatus for positioning said ply on a mold surface and detaching said ply from the backing material, comprising:

means for tensioning the web of backing material;

means for moving the mold surface relative to said web to locate said ply and the mold surface in oriented closely spaced positions relative to each other; and locating means for applying localized force to the surface of the tensioned backing material opposite said ply to move portions of said ply into contact with the mold surface and adhere said portions of said ply to the mold surface, and for removing said force; said locating means including a vacuum cup, means for urging the vacuum cup against the backing material to apply said localized force and push the ply into contact with the mold surface, and means for applying suction to the backing material through the vacuum cup;

said means for tensioning being positioned to allow said tensioning to detach said ply from the backing material upon removal of said force; and said locating means including an array of vacuum cups each of which is independently extensible toward the backing material and retractable away from the backing material, valve means for applying suction through each vacuum cup when the vacuum cup is moved into an extended position, and means for moving the array along the tensioned backing material to progressively adhere portions of the ply to the mold surface and to allow said tensioning, assisted by said suction, to progressively detach the ply from the backing material.

2. The apparatus of claim 1, in which the means for tensioning comprises two spaced reels, and means for applying a torque to each of the reels.

3. The apparatus of claim 1, in which the locating means further includes means for maintaining localized force applied by each vacuum cup to said surface of the tensioned backing material essentially constant as the array moves along the tensioned backing material.

4. In a method of fabricating an article from a plurality of plies of fiber reinforced/resin matrix composite material, said method being of the type in which a cut ply is carried by and removably adhered to a web of backing material, an improved method of positioning said ply on a mold surface and detaching said ply from the backing material, comprising:

tensioning the web of backing material;

positioning the web and the mold surface relative to each other to locate said ply and the mold surface in oriented closely spaced positions relative to each other;

after so positioning the web and the mold surface, applying a plurality of localized forces to the surface of the tensioned backing material opposite said ply to move said ply into contact with portions of the mold surface and adhere said ply to said portions of the mold surface; and while continuing said tensioning, removing said forces from the backing material and separating the backing material from said ply, including allowing said tensioning to detach said ply from the backing material;

in which said localized forces are applied progressively to progressively adhere portions of said ply to the mold surface, and the backing material is progressively separated from said ply; and in which a plurality of vacuum cups are urged against said surface of the tensioned backing material to apply said localized forces, the vacuum cups are moved along the tensioned backing material to progressively adhere said ply to the mold surface, said localized forces are maintained essentially constant as the vacuum cups are moved along the tensioned backing material, and suction is applied to said surface of the tensioned backing material through the vacuum cups to assist said tensioning in detaching said ply from the backing material.

5. A method of fabricating an article from a plurality of plies of fiber reinforced/resin matrix composite material, comprising:

positioning opposite ends of a web of composite material, which is removably adhered to a web of backing material, on spaced reels;

cutting a ply from a portion of the web of composite material between the reels without cutting through the backing material;

applying a torque to each of the reels to tension the web of backing material;

moving a mold surface relative to the web of backing material to position the cut ply and the mold surface in oriented closely spaced positions relative to each other;

after so positioning the cut ply and the mold surface, applying a plurality of localized forces to the surface of the tensioned backing material opposite said ply to move said ply into contact with portions of the mold surface and adhere said ply to said portions of the mold surface; and while continuing said tensioning, removing said forces from the backing material and separating the backing material from said ply, including allowing said tensioning to detach said ply from the backing material;

moving the mold surface and the adhered cut ply away from the web of backing material, and then forming the adhered cut ply to the mold surface;

rotating the reels to position the web of composite material for cutting another ply; and repeating the steps of cutting a ply, moving the mold surface to position the cut ply and the mold surface relative to each other, applying localized forces, and removing said localized forces and separating the backing material;

in which said localized forces are applied progressively to progressively adhere portions of said ply to the mold surface, and the backing material is progressively separated from said ply; and in which a plurality of vacuum cups are urged against said surface of the tensioned backing material to apply said localized forces, the vacuum cups are moved along the tensioned backing material to progressively adhere said ply to the mold surface, said localized forces are maintained essentially constant as the vacuum cups are moved along the tensioned backing material, and suction is applied to said surface of the tensioned backing material through the vacuum cups to assist said tensioning in detaching said ply from the backing material.

* * * * *